US011105278B2

(12) United States Patent
Atterberry et al.

(10) Patent No.: US 11,105,278 B2
(45) Date of Patent: Aug. 31, 2021

(54) DUAL FUEL CYLINDER DEACTIVATION CONTROL SYSTEM AND METHOD

(71) Applicant: Caterpillar Inc., Peoria, IL (US)

(72) Inventors: Nathan Atterberry, Washington, IL (US); Matthew Jordan Engfehr, Dunlap, IL (US); Hua Xu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 786 days.

(21) Appl. No.: 15/423,905

(22) Filed: Feb. 3, 2017

(65) Prior Publication Data
US 2018/0223745 A1 Aug. 9, 2018

(51) Int. Cl.
*B60T 7/12* (2006.01)
*F02D 19/08* (2006.01)
*F02D 41/00* (2006.01)
*F02D 19/06* (2006.01)

(52) U.S. Cl.
CPC ....... *F02D 19/081* (2013.01); *F02D 19/0647* (2013.01); *F02D 41/0025* (2013.01); *F02D 41/0027* (2013.01); *F02D 41/0087* (2013.01); *F02D 41/0082* (2013.01); *F02D 2250/21* (2013.01); *Y02T 10/30* (2013.01)

(58) Field of Classification Search
CPC . F02D 19/081; F02D 41/0087; F02D 41/0082
USPC .................. 701/102, 104; 123/525
See application file for complete search history.

(56) References Cited

U.S. PATENT DOCUMENTS

| 9,334,841 | B1* | 5/2016 | Jackson | F02M 43/00 |
| 9,404,429 | B2* | 8/2016 | Foege | F02D 19/10 |
| 9,482,165 | B2* | 11/2016 | Stockner | F02D 19/10 |
| 9,790,869 | B2* | 10/2017 | Flynn | F02D 19/0642 |
| 10,167,789 | B2* | 1/2019 | Collie | F02D 41/0025 |
| 10,287,997 | B2* | 5/2019 | Flohr | F02D 41/008 |
| 2008/0103676 | A1* | 5/2008 | Ancimer | F02D 19/10 |
| | | | | 701/103 |

(Continued)

FOREIGN PATENT DOCUMENTS

| DE | 2818674 | * 12/2014 | ........ F02D 19/0647 |
| EP | 2 818 674 | 12/2014 | |

(Continued)

*Primary Examiner* — Hung Q Nguyen
*Assistant Examiner* — Anthony Donald Taylor, Jr.
(74) *Attorney, Agent, or Firm* — Finnegan, Henderson, Farabow, Garrett & Dunner, LLP

(57) ABSTRACT

An engine control system includes a dual fuel internal combustion engine, a fuel system including a liquid fuel source and a gaseous fuel source, and a controller. The engine control system further includes a liquid fuel control module and at least one gaseous fuel control module associated with a first and second subset of cylinders, each communicatively connected over a network. The controller has an operating mode and a cylinder deactivation mode. The controller in the operating mode is configured to instruct the liquid fuel control module and the at least one gaseous fuel control module to operate the plurality of cylinders in a dual fuel mode. The controller in the cylinder deactivation mode transitions the plurality of cylinders to a liquid-fuel only mode over a phase out period, deactivates the first subset of cylinders, and then transitions to the dual fuel mode in the second subset of cylinders.

17 Claims, 4 Drawing Sheets

(56) References Cited

U.S. PATENT DOCUMENTS

| | | | | |
|---|---|---|---|---|
| 2013/0220274 A1* | 8/2013 | Deshpande | ............ | F02D 19/105 123/350 |
| 2013/0306029 A1* | 11/2013 | Stockner | ............ | F02M 21/0245 123/445 |
| 2014/0069386 A1* | 3/2014 | Coldren | ................ | F02D 19/061 123/456 |
| 2014/0214306 A1* | 7/2014 | Badillo | .................. | F02D 19/08 701/104 |
| 2014/0373822 A1* | 12/2014 | Rosswurm | .......... | F02D 41/0027 123/676 |
| 2015/0034042 A1* | 2/2015 | Ritscher | ................ | F02D 41/266 123/27 GE |
| 2017/0022927 A1* | 1/2017 | Sanborn | ................. | F02M 59/20 |

FOREIGN PATENT DOCUMENTS

| | | | | |
|---|---|---|---|---|
| WO | WO 2016/100668 | | 6/2016 | |
| WO | WO 2016/154086 | | 9/2016 | |
| WO | WO2016154086 | * | 9/2016 | ............. F02B 47/10 |

\* cited by examiner

DUAL FUEL CYLINDER DEACTIVATION CONTROL SYSTEM AND METHOD

TECHNICAL FIELD

The present disclosure relates generally to an engine control system and method, and more particularly, to an engine control system for a dual fuel engine having a dual fuel control and cylinder deactivation strategy.

BACKGROUND

Cylinder deactivation is a method of reducing or completely stopping combustion within one or more cylinders of an engine. Cylinder deactivation is generally initiated during periods of light loading of the engine to improve efficiency and reduce fuel usage. Deactivation is particular useful for work machines having long idle periods where the engine remains running under light load. Generally, one or more cylinders are deactivated while an active subset of cylinders continues to operate. For single fuel engines (e.g., diesel engines, etc.), a straightforward fuel strategy of ceasing injection is sufficient. However, for dual fuel engines in which a gaseous and liquid fuel is being combusted, an improved fueling strategy is required. In some dual fuel engines, gaseous fuel can be injected up to 500 crank angle degrees before top dead center, causing substantial phase delay between injection and combustion. This phase delay can interfere with existing cylinder deactivation control techniques and can result in misfire during cylinder deactivation or double fire upon cylinder activation. Additionally, for dual fuel engines with a separate control module for each fuel type, the ability to control the precise quantity of fuel in each cylinder at any given time is further limited due to electronic and communication protocol characteristics between the control modules, which can exacerbate the phase delay problem. Therefore, there is a need for a robust cylinder deactivation method which ultimately allows for increased gas substitution in the cylinder when using separate control modules for controlling the injection of each fuel.

One engine control method and system for deactivating cylinders in a dual fuel engine is described in PCT Publication Number WO 2016/154086A1 (the '086 publication), published to Kolhouse et al. on Sep. 29, 2016. The '086 publication describes an engine control system that reduces gaseous fuel injection in a targeted bank of cylinders designated to be deactivated while continuing to maintain dual fuel combustion in the remaining cylinders.

Although the method and system of the '086 publication may address issues of dual fuel engine deactivation with respect to its effects on exhaust gas and injector requirements, it does not address the problems associated with phase delays in gaseous injection and cylinder deactivation and activation requests. Nor does it address the problems of double fire or misfire conditions when deactivating or activating cylinders of a dual fuel engine.

The disclosed system is directed to overcoming one or more of the problems set forth above.

SUMMARY OF THE INVENTION

In one aspect, the present disclosure is directed to an engine control method that includes operating a dual fuel internal combustion engine including a plurality of cylinders configured to receive a liquid fuel and a gaseous fuel. The method includes determining a cylinder deactivation event and entering a cylinder deactivation mode after determination of the cylinder deactivation event, including identifying a first subset of cylinders to be deactivated, reducing a quantity of the gaseous fuel relative to the liquid fuel from an initial quantity over a phase out period for the plurality of cylinders, deactivating the first subset of cylinders while continuing to operate an active subset of cylinders, and increasing the quantity of the gaseous fuel relative to the liquid fuel over a phase in period for the active subset of cylinders.

In another aspect, the present disclosure is directed to an engine control method that includes operating a dual fuel internal combustion engine including a plurality of cylinders configured to receive a liquid fuel and a gaseous fuel, a liquid fuel control module, a first gaseous fuel control module associated with a first subset of cylinders and a second gaseous fuel control module associated with a second subset of cylinders. The method includes determining a cylinder deactivation event and entering a cylinder deactivation mode after determination of the cylinder deactivation event. Entering the cylinder deactivation mode includes instructing the first gaseous fuel control module and the second gaseous fuel control module to reduce a quantity of the gaseous fuel in the plurality of cylinders relative to the liquid fuel from an initial quantity over a phase out period while instructing the liquid fuel control module to continue operating the plurality of cylinders with the liquid fuel over the phase out period; deactivating the first subset of cylinders by instructing the liquid fuel control module to cease injection of the liquid fuel in the first subset of cylinders while continuing to inject liquid fuel into the second subset of cylinders; and instructing the second gaseous fuel control module to increase the quantity of the gaseous fuel relative to the liquid fuel to the initial quantity over a phase in period for the second subset of cylinders.

In yet another aspect, the present disclosure is directed to an engine control system that includes a dual fuel internal combustion engine having a plurality of cylinders configured to receive a liquid fuel and a gaseous fuel, a fuel system including a liquid fuel source and a gaseous fuel source, and a controller. The engine control system further includes a controller, a liquid fuel control module, and at least one gaseous fuel control module associated with a first subset of cylinders and a second subset of cylinders, each communicatively connected over a network. The controller has an operating mode and a cylinder deactivation mode. The controller in the operating mode is configured to instruct the liquid fuel control module and the at least one gaseous fuel control module to operate the plurality of cylinders in a dual fuel mode. The controller in the cylinder deactivation mode being configured to instruct the liquid fuel control module and the at least one gaseous fuel control to transition to a liquid-fuel only mode over a phase out period; instruct the liquid fuel control module to deactivate the first subset of cylinders by ceasing injection of the liquid fuel into the first subset of cylinders after the phase out period while continuing to inject liquid fuel into the second subset of cylinders; and instruct the liquid fuel control module and the at least one gaseous fuel control module to transition to the dual fuel mode in the second subset of cylinders after the first subset of cylinders are deactivated.

DETAILED DESCRIPTION

Figure 1:
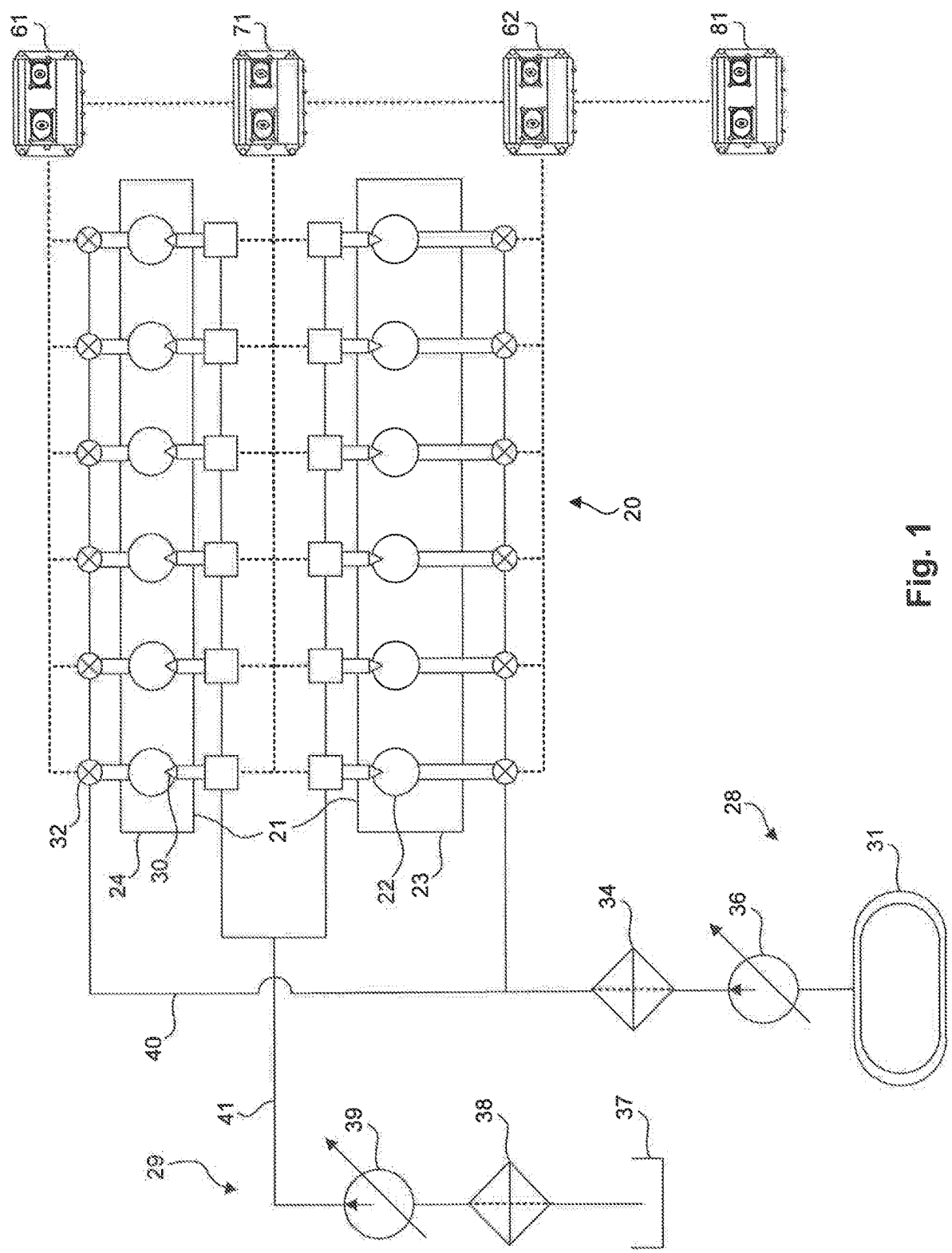
FIG. 1 is a schematic view of an exemplary disclosed engine control system.

FIG. 1 provides a schematic view of an exemplary disclosed engine control system. The system includes a dual fuel engine 20 having an engine block 21 that defines a plurality of engine cylinders 22. A piston reciprocates in each of the cylinders 22 to define a compression ratio, which is generally associated with a compression ratio suitable for compression igniting an injected liquid, such as diesel. In the illustrated embodiment, engine 20 includes twelve engine cylinders 22. However, those skilled in the art will appreciate that an engine with any number of cylinders would also fall within the intended scope of the present disclosure.

The engine 20 includes a fuel system that supplies a liquid fuel and a gaseous fuel to the cylinders 22 for combustion. A liquid fuel injector 30 is positioned for direct injection of liquid fuel into each of the plurality of cylinders 22. The fuel system may include a high pressure gaseous fuel common rail and a liquid fuel common rail, or the fuel system may include a low pressure fuel pump with unit injectors. In either embodiment, the fuel system includes a liquid fuel source 29 supplying a liquid fuel (e.g., diesel fuel) to the engine 20 and a gaseous fuel source 28 supplying a gaseous fuel (e.g., compressed natural gas) to the engine 20.

The gaseous fuel source 28 may include a pressurized cryogenic liquid natural gas tank 31 with an outlet fluidly connected to a variable delivery cryogenic pump 36. Although not all shown in FIG. 1, the gaseous fuel source 28 may also include a heat exchanger, an accumulator, a fuel conditioning module that controls the pressure of gaseous fuel supplied to the engine 20, and a gas filter 34. The liquid fuel source 29 may include a diesel fuel tank 37, fuel filters 38 and a fuel pump 39 that supplies liquid fuel to, and controls pressure delivered to, the engine 20. Additional controls including a shutoff valve may be located between the pressurized cryogenic liquid natural gas tank 31 and the engine 20 to isolate the tank 31 from the engine 20.

Gaseous and liquid fuel lines 40, 41 may supply fuel to the engine 20. For the purposes of this disclosure, the engine 20 is depicted and described as having twelve cylinders arranged in a first bank of cylinders 23 and a second bank of cylinders 24. One skilled in the art will recognize, however, that engine 20 may include a greater or lesser number of cylinders, and that the cylinders 22 may be disposed in an "inline" configuration, in a "V" configuration, in opposing configuration, or in any other suitable configuration. Fuel from lines 40, 41 is delivered to the engine 20 by way of individual fuel injectors 30 and gas admission valves 32. The fuel injectors 30 inject the liquid fuel directly into the cylinders 22, while the gas admission valves 32 release gaseous fuel upstream of the cylinders 22. This may include injection of gaseous fuel within an intake manifold or upstream of a turbocharger ambient air inlet (not shown). The fuel injectors 30 may embody, by way of example, electronically actuated injectors (e.g., electronically controlled unit injectors, mechanically actuated), electronically controlled injectors, digitally controlled fuel valves, or any other type of fuel injectors known in the art. Each fuel injector 30 and gas admission valve 32 may be separately and independently operable to inject/release an amount of pressurized fuel into an associated cylinder 22 at predetermined timings, fuel pressures, and fuel flow rates.

A piston (not shown) may be slidably disposed within each of cylinders 22 so as to reciprocate between a top-dead-center (TDC) position and a bottom-dead-center (BDC) position while turning a crankshaft through a complete revolution. During a revolution, the piston undergoes an intake stroke, a compression stroke, a combustion or power stroke, and an exhaust stroke. Pistons may be operatively connected to the crankshaft via a plurality of connecting rods. The crankshaft may be rotatably disposed within the engine block 21 and operatively connected to a generator or to a machine transmission such that a rotating motion of each crankshaft results in a corresponding rotation of connected generator or transmission.

In a diesel cycle, the pistons may move through the intake stroke from the TDC position to the BDC position to draw air into the respective cylinders 22. The piston may then return to the TDC position, thereby compressing the air during the compression stroke. Toward an end of the compression stroke and/or during a first portion of the power stroke, a fuel injector 30 and a gas admission valve 32 associated with each cylinder 22 may deliver pressurized injections of liquid fuel and gaseous fuel, respectively, into the cylinders 22. The pressurized injections may mix with pressurized air within the cylinder during the compression stroke and initiate combustion of the liquid and gaseous fuels. When ignited, the air-fuel mixture may cause the piston to move back to the BDC position during the power stroke. This downward movement of the piston powers the rotational movement of the crankshaft and thus rotational movement to the generator or transmission. The piston may then return to the TDC position to expel exhaust gases from cylinders 22 during the exhaust stroke.

In the present embodiment, engine 20 is a dual fuel engine configured to combust two different types of fuel and generate a mechanical output that drives a machine or a generator. Engine 20 may operate in a liquid-fuel only mode in which only liquid fuel is injected into the cylinders 22, or a dual fuel mode in liquid and gaseous fuel is being injected and admitted into the cylinders 22. Which fuel to inject, how much of each fuel type, and when to inject each fuel is determined by a controller 81 that is in communication with at least one liquid fuel control module 71 and at least one gaseous fuel control module 61, 62. Although FIG. 1 depicts a first gaseous fuel controller 61 and a second gaseous fuel controller 62, the system may include embodiments with only one gaseous fuel controller.

The controller 81, the at least one liquid fuel control module 71, and the at least one gaseous fuel control module 61, 62 are each communicatively connected over a network (e.g., a CAN network). In one embodiment, the first gaseous fuel control module 61 may be associated with a first subset of cylinders and the second gaseous fuel control module 62 may be associated with a second subset of cylinders. Each subset may include a bank of cylinders, with the first subset of cylinders including the first bank of cylinders 23 and the second subset of cylinders including the second bank of cylinders 24.

In some situations, it may be desirable to have fewer than all cylinders 22 of the engine 20 operational. The controller 81 therefore may have an operating mode and a cylinder deactivation mode. Cylinder deactivation mode may be triggered when the controller 81, monitoring various parameters of the engine and associated machine, determines a cylinder deactivation event. When a cylinder deactivation event is determined, the controller 81 may enter the cylinder deactivation mode and instruct the at least one liquid fuel control module 71 and at least one gaseous fuel control module 61, 62 to initiate steps to deactivate one or more cylinders 22 of the engine 20. This allows the engine 20 to continue operating without all cylinders 22 being active, thereby injecting less fuel and reducing consumption.

Cylinder deactivation events may correspond with, for example, low engine speeds, low engine loads, idle periods, and/or cold operation. Specifically, during low engine speed and/or low load situations, the amount of fuel injected by any one fuel injector 30 and gas admission valve 32 may be relatively small. It should be understood that total injected fuel may refer to the total liquid fuel in liquid-fuel only mode, or total liquid and gaseous fuel in the dual fuel mode. In general, when the amount of total injected fuel falls below a threshold value, because of parasitic losses of the machine or generator, an efficiency of the engine 20 may be affected (e.g., reduced) or gas substitution capability of the engine 20 may be limited. During this situation, it may be better to have fewer than all of cylinders 22 operational such that the total amount of injected fuel is reduced and/or is spread between fewer injectors 30. In some instances, the fuel injectors 30 may inject a greater and more efficient amount of fuel when less than all cylinders are active. Alternatively, fewer injectors may operate with the same quantity of injected fuel as prior any cylinder deactivation. During cold operation, the amount of fuel injected by any one fuel injector 30 may be too little to sufficiently warm the engine 20. In this situation, it may again be advantageous to employ fewer active cylinders 22 such that each active fuel injector 30 and gas admission valve 32 may inject a greater amount of fuel and thereby allow more gas substitution to occur in the active cylinders 22 compared to all of cylinders 22 in operation. Thus, in some situations, a subset of cylinders 22 may be deactivated (i.e., a subset of fuel injectors 30 and gas admission valves 32 may cease injecting fuel into the engine 20). The control process for deactivating each cylinder (or subset of cylinders) and activating each cylinder (or subset of cylinders) is further detailed below.

In order to regulate operation of fuel injectors 30 and the gas admission valves 32, and to selectively deactivate cylinders 22, the controller 81 is in communication with and instructs the at least one liquid fuel controller 71 and at least one gaseous fuel controller 61/62 how and when to inject fuel into the engine 20. The controller 81 may receive input from one or more sensors on the machine and in the engine 20, and furthermore may receive input from an operator. The inputs from the sensors may indicate to the controller 81 a cylinder deactivation event, or alternatively the input from the operator may be used to manually trigger the cylinder deactivation mode. The controller 81 is configured to output signals to the at least one liquid fuel controller 71 and at least one gaseous fuel controller 61/62, providing the modules with deactivation instructions. Thus, the controller 81 may determine a need to deactivate one or more cylinders 22 and responsively adjust operation of fuel injectors 30 and gas admission valves 32 via the modules 71, 61, 62 to accommodate particular operating conditions of the engine 20 and/or inputs from the operator.

The controller 81, the at least one liquid fuel controller 71, and the at least one gaseous fuel controller 61/62 may each embody a single or multiple microprocessors, field programmable gate arrays (FPGAs), digital signal processors (DSPs), etc. that include a means for controlling an operation of the engine 20 in response to various inputs. Numerous commercially available microprocessors can be configured to perform the functions of each of the controller 81, the at least one liquid fuel controller 71, and the at least one gaseous fuel controller 61/62. Various other known circuits may be associated with the controller 81, the at least one liquid fuel controller 71, and the at least one gaseous fuel controller 61/62, including power supply circuitry, signal-conditioning circuitry, actuator driver circuitry (e.g., circuitry powering solenoids, motors, or piezo actuators), communication circuitry, and other appropriate circuitry.

The controller 81 may be configured to determine a number of cylinders 22 to deactivate (i.e., a number of fuel injectors 30 and gas admission valves 32 to inhibit from fueling an associated cylinder 22) such that the performance of engine 20 substantially remains within or returns to a desired operating range. In one example, the controller 81 may, based on a signal from one or more sensors and/or based on another input, reference one or more relationship maps stored in a memory. Each of these maps may include a collection of data in the form of tables, graphs, and/or equations. One such relationship map may, for example, relate a desired output (i.e., torque and/or speed) of the engine to an amount of fuel that must be injected into and combusted within the engine. The same or a different relationship map may then relate that amount fuel to a number of fuel injectors 30 and gas admission valves 32 that should be operational to inject the amount of fuel and still maintain a desired efficiency and/or a desired temperature of the engine 20, and a corresponding remaining number of cylinders 22 (i.e., a subset of cylinders 22) that should be deactivated. In some embodiments, when deactivating cylinders 22 the amount of fuel being injected into any one cylinder 22 remaining operational may increase to maintain the same mechanical output. Controller 81 may be configured to determine and implement an increased fueling at the same time as and in an amount proportional the disabling of cylinders 22.

When adjusting the operation of fuel injectors 30, the controller 81 may directly the liquid fuel control module(s) 71 to generate and send fuel delivery altering signals to the fuel injectors 30. These signals may function to adjust a fuel delivery rate, a fuel delivery timing, a fuel delivery pressure, and/or a fuel torque limit. These fuel delivery altering signals may be produced in accordance with engine control maps such as, for example, rail pressure maps, timing maps, torque limit maps, etc., as are known in the art. The fuel delivery altering signals may be delivered to all fuel injectors 30 associated with the particular liquid fuel module 71 or a subset of fuel injectors 30 associated with the particular liquid fuel module 71.

In one embodiment, a particular subset of cylinders 22 may vary between deactivating events or a designated subset of cylinders 22 (e.g., the first bank 23 or second bank 24) may be deactivated at a time. Moreover, the deactivated and active cylinders 22 may swap after undergoing a deactivation cycle, after which deactivated cylinders are activated and vice versa. For example, in a twelve cylinder engine, it may be fairly common to selectively disable four or even six of the twelve cylinders 22. Between deactivation events, controller 81 may select different cylinders 22 to be included within the next subset of cylinders 22 to be deactivated. In this manner, no one cylinder 22 may either be operational or non-operational significantly more than any other cylinder 22. In one embodiment, however, the first bank of cylinders 23 may be deactivated while the second bank of cylinders 24 is active, and the two alternate status after each deactivation cycle. The deactivation cycle may be a predetermined time period set by the controller 81, causing cylinders 22 to alternate between deactivated and active in a uniform pattern. Alternatively, the deactivation cycle may incorporate inputs from various sensors, the inputs modifying how long each deactivation cycle is depending on which cylinders are deactivated/active and the status of the engine (e.g., if one side of the engine is too cold, if a malfunction is being registered, etc.). Therefore, in this embodiment the deactivation cycle may be variable and change based on inputs from sensors and other inputs.

In one embodiment, during a transition from a deactivated first subset of cylinders 22 to a second subset, all cylinders 22 of the second subset may be deactivated as a group at about the same time a first subset of cylinders 22 is re-enabled (e.g., activated). For example, in a twelve cylinder engine where six cylinders 22 have been deactivated, another subset of six cylinders 22 may be deactivated all at once and at substantially the same time the first subset of six cylinders 22 is re-enabled. In most situations, the number of cylinders 22 in each subset may be about equal. In other embodiments, however, the number of cylinders 22 that are deactivated at any one time may be variable. Moreover, a time delay may be employed between cylinder disablings such that there is overlap between the deactivated and active cylinders.

INDUSTRIAL APPLICABILITY

The disclosed engine control system may be applicable to any machine that includes an internal combustion engine powered by a liquid and gaseous fuel. The disclosed engine control system may improve cylinder deactivation of such a dual fuel internal combustion engine by allowing gaseous fuel to be expelled from the engine cylinders before deactivating the liquid fuel injectors. This addresses problems associated with phase delay between release of gaseous fuel into the cylinder and combustion where deactivation is desired in the cylinders. This also addresses problems associated with controlling the liquid and gaseous fuel content in the cylinders 22 when employing separate control modules for the liquid and gaseous fuel. The operation of engine control system will now be explained.

For dual fuel engines 20, gas admission valves 32 allow gaseous fuel to enter the cylinders 22 and injectors 30 directly inject liquid fuel into the cylinders 22. The operation of the gas admission valves 32 is governed by the one or more gaseous fuel control modules 61, 62, while operation of the injectors 30 is governed by the one or more liquid fuel control modules 71. Because of the two different fuel delivery techniques employed, the operation of the gas admission valves 32 is not synchronized with the fuel injectors 30. Moreover, there is significant phase delay between operation of the gas admission valves 32 and combustion of the gaseous fuel in the cylinders 22. Because of this, the controller 81 cannot simultaneously cease injection of gaseous fuel and liquid fuel at any one moment. Moreover, the communication signals across the communication network cannot be synchronized. Therefore, it is advantageous to first disable the release of gaseous fuel into the cylinders while continuing injection of the liquid fuel to allow the gaseous fuel to combust in the cylinders 22 before triggering deactivation.

Figure 2:
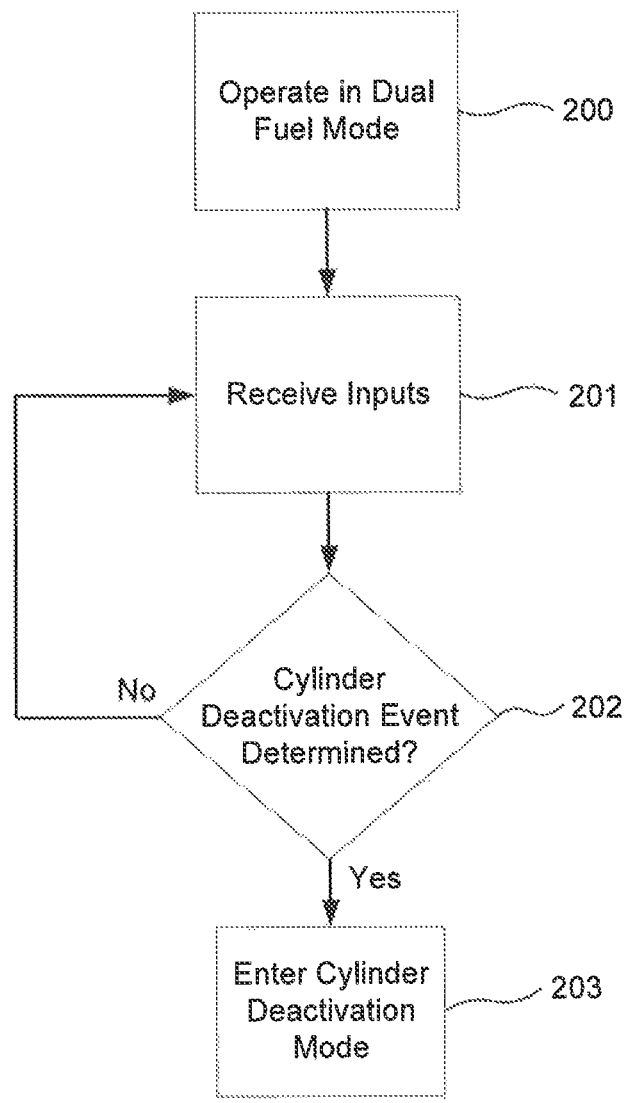
FIG. 2 is a flow diagram illustrating an exemplary disclosed method of operating the engine control system of FIG. 1.

Referring to FIG. 2, operation of the engine control system is shown. The control method includes operating a dual fuel internal combustion engine (Step 200), the internal combustion engine having a plurality of cylinders configured to receive a liquid fuel and a gaseous fuel. During operation of the internal combustion engine, the controller 81 receives inputs (Step 201) from various sensors within the internal combustion engine, on the machine supporting the engine, and from the operator. Sensor inputs may include, among others, engine load, engine speed, engine torque, coolant temperature, oil temperature, intake manifold temperature, ambient air temperature, and inlet air temperature. Operator inputs may include manually-triggered inputs by a machine operator or system operator, signaling the controller 81 to take particular actions such as to enter or exit the cylinder deactivation mode. The controller 81 receives these inputs and monitors their values to determine whether the sensor signals are within a predetermined range. The predetermined range may include desired or acceptable ranges before the engine can enter the cylinder deactivation mode. Finally, the controller 81 monitors for any diagnostic faults associated with the engine, including any registered component failure, failed processes, or failed checks that are normally processed by the controller 81 and/or a separate controller.

Next, the controller 81 may determine a cylinder deactivation event from the inputs (Step 202). In one embodiment, the controller 81 determines a cylinder deactivation event when the engine load is below a threshold load and the engine speed is below a threshold speed for a predetermined period of time. In other embodiments, the controller 81 additionally determines a cylinder deactivation event by also determining whether one or more of the coolant temperature, intake manifold temperature, ambient temperature, and inlet air temperature are within a predetermined range, and by determining no diagnostic faults have been triggered. In yet another embodiment, the controller 81 determines a cylinder deactivation event by receiving a cylinder deactivation mode input from the operator. If no cylinder deactivation event is determined (Step 202, No), then the process reverts back to step 201 and continues receiving inputs until the controller 81 can determine the cylinder deactivation event. Upon determining a cylinder deactivation event (Step 202, Yes), the controller 81 may enter the cylinder deactivation mode (Step 203).

Figure 3:
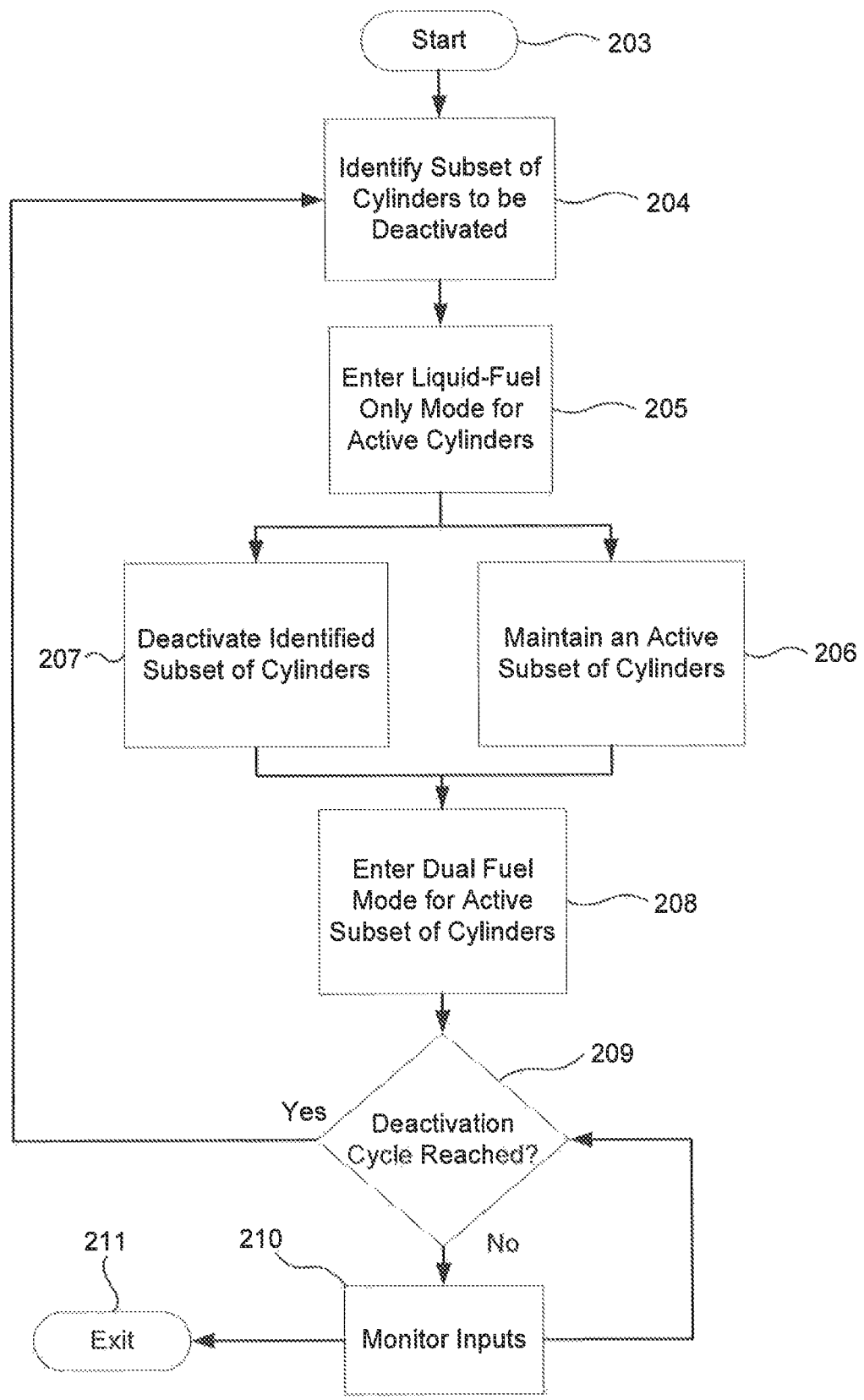
FIG. 3 is another flow diagram illustrating an exemplary disclosed method of operating the engine control system of FIG. 1.

FIG. 3 provides a flowchart for the controller 81 in cylinder deactivation mode. Upon determining a cylinder deactivation event (Step 202, Yes) and entering the cylinder deactivation mode (Step 203), in one embodiment the controller 81 may identify a subset of cylinders to be deactivated (Step 204). The subset may include one or more cylinders or one or more cylinder banks. The subset of cylinders may also include all active cylinders or a subset of active cylinders, where another subset of cylinders are already deactivated (e.g., to alternate the subset of deactivated cylinders).

Before deactivating the subset of cylinders identified in Step 204, the controller 81 may enter a liquid-fuel only mode for all active cylinders (Step 205). The liquid-fuel only mode includes the controller 81 instructing the one or more liquid fuel control modules 71 and the one or more gaseous fuel control modules 61, 62 to gradually cease admission of gaseous fuel into the active cylinders while continuing to inject liquid fuel. The flow rate and duration of liquid fuel injected by the liquid fuel injectors 30 may be increased or otherwise altered by the liquid fuel control modules 71 to compensate for the loss of gaseous fuel in the cylinder 22 to maintain constant power output of the engine or constant governed engine speed. During this process, the controller 81 instructs the one or more gaseous fuel control modules 61, 62 to reduce a quantity of the gaseous fuel relative to the liquid fuel from an initial quantity over a phase out period for the plurality of cylinders. In some embodiments, the quantity of gaseous fuel relative the liquid fuel is reduced to zero (e.g., only liquid fuel is being introduced into the active cylinders).

Once the active cylinders of the engine 20 are operating in liquid-fuel only mode (e.g., operating using only liquid fuel), the controller 81 instructs the at least one liquid fuel control module 71 to deactivate the identified subset of cylinders to be deactivated from Step 204 (Step 207). Simultaneously or just subsequent to deactivation in Step 207, the controller 81 instructs the at least one liquid fuel control module 71 to continue operating an active subset of cylinders (Step 206). In this step, the active subset cylinders are being fueled by the liquid fuel injectors 30 and are operating in the liquid-fuel only mode. After the identified subset of cylinders has been deactivated and the active subset of cylinders are maintained, the controller 81 may instruct the at least one gaseous fuel control module 61, 62 and the at least one liquid fuel control module 71 to enter a dual fuel mode for the active subset of cylinders (Step 208). In this step, the at least one gaseous fuel control module 61, 62 and the at least one liquid fuel control module 71 increase the quantity of the gaseous fuel relative to the liquid fuel over a phase in period for the active subset of cylinders. Once the phase in period has been reached, the appropriate ratio of gaseous fuel to liquid fuel is being introduced into the active cylinders to meet demand, according to the relationship maps described above. In some embodiments, this entails increasing the quantity of gaseous fuel to an initial quantity (e.g., prior to liquid-fuel only mode).

Once the dual fuel mode has been realized for the active subset of cylinders in step 208, the controller 81 continues to operate the active subset of cylinders for a deactivation cycle. The deactivation cycle is a period of time in which the engine operates a subset of cylinders and deactivates another subset of cylinders. The duration of this time period may be affected by various inputs, or it may be uniform, as described above. Therefore, the controller may determine whether a deactivation cycle has been reached (Step 209), after which the process returns to the step 204 and the controller 81 identifies another subset of cylinders to be deactivated. The process can repeat, with different subsets of cylinders being deactivated and activated each cycle, or alternating between two or more banks of cylinders being activated and deactivated. If the deactivation cycle is not reached in Step 209, the controller 81 may continue to monitor inputs (Step 210) and maintain the active subset of cylinders until sensor data, operator input, or other inputs triggers the controller 81 to exit cylinder deactivation mode (Step 211).

If a deactivation cycle is reached in step 209, the controller 81 may identify a second subset of cylinders to be deactivated, enter the liquid-fuel only mode for the active cylinders, deactivate the second subset of cylinders while maintaining a second active subset of cylinders, and then enter duel fuel mode for the second active subset of cylinders. This process can continue until the cylinder deactivation mode is exited (Step 211). Moreover, at any point in the process, the controller 81 may exit the cylinder deactivation mode and activate all cylinders 22 of the engine 20. This may be required based on sensor input or operator input.

To exit the cylinder deactivation mode, the deactivated cylinders must be activated. To do this, the controller 81 enters the liquid-fuel only mode for the active subset of cylinders. In the liquid-fuel only mode, the active cylinders currently operating in dual fuel mode are instructed to operate on liquid fuel only. The controller 81 instructs the at least one gaseous fuel control module 61, 62 to cease injection of gaseous fuel while instructing the liquid fuel control module 71 to inject liquid fuel into an active subset of cylinders over a phase out period. Once the engine is running on liquid-only mode (e.g., only using the liquid fuel injectors), the controllers activates all cylinders 22 of the engine 20 after the phase out period by instructing the liquid fuel control module 71 to inject liquid fuel into the deactivated subset of cylinders. Once all cylinders are active using the liquid fuel, the controller 81 enters duel fuel mode for all cylinders by instructing the at least one gaseous fuel control module 61, 62 to increase the quantity of the gaseous fuel relative to liquid fuel over a phase in period. The liquid fuel control module 71 may compensate for the introduction of the gaseous fuel by injecting more or less liquid fuel, according to the relationship maps described above.

Therefore, each instance of cylinder deactivation is accompanied by first a transition to liquid-fuel only mode where gaseous fuel is not introduced into the cylinders and the liquid fuel injectors continue to inject liquid fuel in the active cylinders. Once the gaseous fuel combusts in the cylinders over a phase out period, the identified cylinders can be deactivated. Once deactivated, the gaseous fuel can be reintroduced in those active cylinders. The process repeats when alternating or changing the active/deactivated cylinders or when exiting cylinder deactivation mode.

Figure 4:
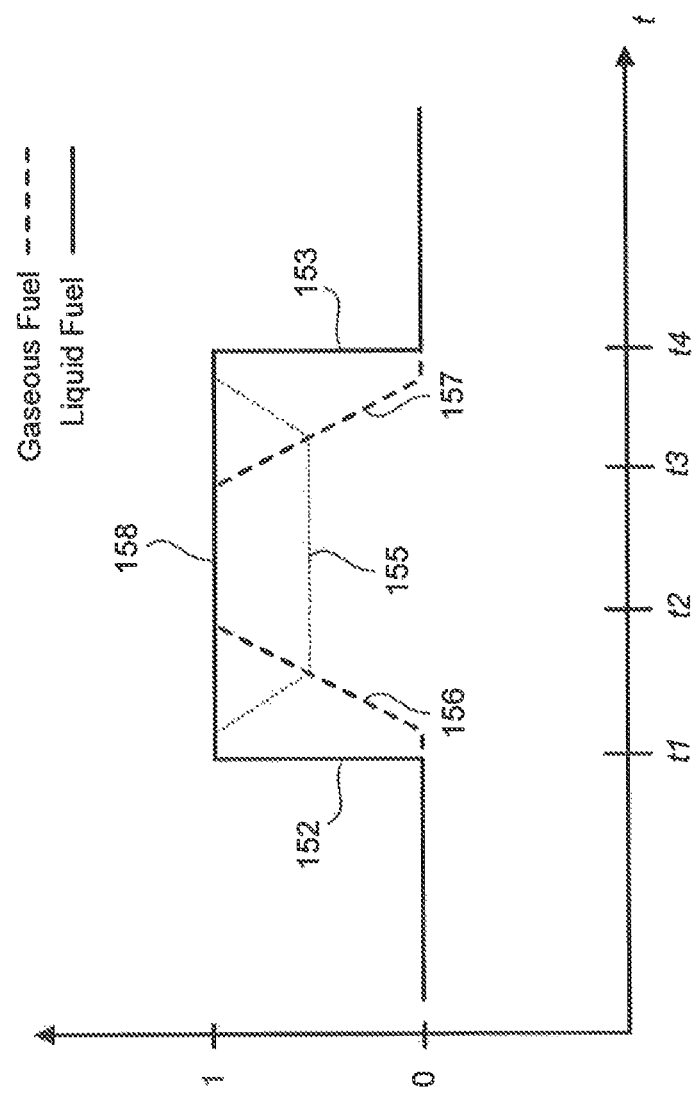
FIG. 4 is a graph illustrating an exemplary fuel delivery of gaseous fuel and liquid fuel of the disclosed method.

As shown in the graph of FIG. 4, an embodiment of the engine control system is presented showing the relationship between the gaseous fuel content and the liquid fuel content in the cylinder over time. The liquid fuel injectors 30 introduce liquid fuel directly into the cylinders 22 by direct injection. The liquid fuel injectors 30 may therefore cease and initiate with minimal time delay or phase difference between injection and engine crank angle position. The gas admission valves 32 introduce gaseous fuel upstream of the cylinders, producing a delay between admission and combustion. Therefore, in order to prevent gaseous fuel from being trapped in a deactivated cylinder, in one embodiment the gaseous fuel is ceased over a phase out period while the liquid fuel injectors continue operating while entering the liquid-fuel only mode. This allows the gaseous fuel to combust in the cylinder and the cylinder to continue operating on liquid fuel. Once all gaseous fuel is combusted over the phase out period, the liquid fuel injector can be ceased and the cylinder is deactivated.

As shown in FIG. 4, the transition of a previously deactivated cylinder to an activated cylinder is shown at time t1. The liquid fuel injectors 30 are initiated in the previously deactivated cylinder, represented at line 152 at time t1. The gas admission valves admit gaseous fuel into the cylinder over the phase in period, represented by line 156 and between time t1 and t2. The once the phase in period has lapsed at time t2, the cylinder is operating in dual fuel mode, represented by line 158 and between times t2 and t3. The quantity of liquid fuel injected can be altered as more gaseous fuel is introduced, represented by broken line 155. After a deactivation cycle is complete, or upon alternative input, the controller 81 may identify the cylinder for deactivation at time t3. To deactivate the cylinder, the cylinder transitions to liquid-fuel only mode and reduces a quantity of the gaseous fuel relative to the liquid fuel over a phase out period, represented by line 157 and between time t3 and t4. Once the cylinder is operating in liquid-fuel only mode and the gaseous fuel has been combusted in the cylinder over the phase out period, the cylinder can be deactivated at time t4. The liquid fuel injectors 30 cease injecting liquid fuel into the cylinder at line 153. The graph of FIG. 4 is an embodiment of the engine control method. The relationship between the quantity of each fuel and the magnitudes shown in the graph are not to scale. The quantity of gaseous fuel and liquid fuel being introduced into the cylinder is governed by relationship maps, described above, and governed by the controller 81 and respective modules.

Several advantages over the prior art may be associated with the present engine control system. These include providing a more robust deactivation strategy when a gaseous and liquid fuel is used to fuel the engine. In light loading conditions in particular, the present engine control system provides a method of deactivating dual fuel cylinders that eliminates potential double fire conditions from leftover gaseous fuel. Moreover, the present engine control system may allow a dual fuel engine to operate and deactivate cylinders while operating using lower quality gaseous fuel than typical methods.

It will be apparent to those skilled in the art that various modifications and variations can be made to the disclosed engine control system. Other embodiments will be apparent to those skilled in the art from consideration of the specification and practice of the disclosed present engine control system. It is intended that the specification and examples be considered as exemplary only, with a true scope being indicated by the following claims and their equivalents.

What is claimed is:

1. An engine control method, comprising:
    operating a dual fuel internal combustion engine including a plurality of cylinders configured to receive a liquid fuel and a gaseous fuel;
    determining a cylinder deactivation event; and
    entering a cylinder deactivation mode after determination of the cylinder deactivation event, including:
        identifying a first subset of cylinders to be deactivated from among the plurality of cylinders;
        gradually reducing a quantity of the gaseous fuel relative to the liquid fuel from an initial quantity over a phase out period and then ceasing injection of the gaseous fuel for all cylinders in the plurality of cylinders;
        deactivating the first subset of cylinders by ceasing injection of the liquid fuel into the first subset of cylinders while continuing to operate remaining cylinders in the plurality of cylinders using the liquid fuel; and
        increasing the quantity of the gaseous fuel relative to the liquid fuel over a phase in period for the remaining cylinders.

2. The engine control method of claim 1, wherein the quantity of the gaseous fuel relative to the liquid fuel is increased to the initial quantity over the phase in period.

3. The engine control method of claim 1, wherein determining the cylinder deactivation event includes:
    monitoring an engine load and an engine speed of the dual fuel internal combustion engine; and
    determining the cylinder deactivation event when the engine load is below a threshold load and the engine speed is below a threshold speed for a predetermined period of time.

4. The engine control method of claim 3, wherein determining the cylinder deactivation event further includes:
    determining whether one or more of a coolant temperature, an intake manifold temperature, an ambient temperature, and an inlet air temperature are within a predetermined temperature range; and
    determining whether one or more diagnostic faults have not been triggered.

5. The engine control method of claim 1, wherein determining the cylinder deactivation event includes:
    receiving a cylinder deactivation mode input from an operator.

6. The engine control method of claim 2, wherein the phase out period is a first phase out period and the phase in period is a first phase in period, the engine control method further including:
    continuing to operate the remaining cylinders for a first deactivation cycle;
    identifying a second subset of cylinders to be deactivated from among the remaining cylinders;
    reducing the quantity of the gaseous fuel relative to the liquid fuel from the initial quantity over a second phase out period and then ceasing injection of the gaseous fuel for all the remaining cylinders;
    deactivating the second subset of cylinders by ceasing injection of the liquid fuel into the second subset of cylinders while operating a third subset of cylinders with the liquid fuel, the third subset of cylinders including cylinders in the remaining cylinders other than the second subset of cylinders; and
    increasing the quantity of the gaseous fuel relative to the liquid fuel over a second phase in period for the third subset of cylinders.

7. The engine control method of claim 1, wherein the phase in period is a first phase in period, the engine control method further including:
    exiting the cylinder deactivation mode, including:
        ceasing injection of the gaseous fuel while continuing to inject liquid fuel into the remaining cylinders;
        activating the first subset of cylinders including injecting liquid fuel into the first subset of cylinders; and
        injecting gaseous fuel into all cylinders in the plurality of cylinders to increase the quantity of the gaseous fuel relative to the liquid fuel over a second phase in period.

8. An engine control method, comprising:
    operating a dual fuel internal combustion engine including a first subset of cylinders and a second subset of cylinders configured to receive a liquid fuel and a gaseous fuel, a liquid fuel control module, a first gaseous fuel control module associated with the first subset of cylinders, and a second gaseous fuel control module associated with the second subset of cylinders;
    determining a cylinder deactivation event;
    entering a cylinder deactivation mode after determination of the cylinder deactivation event, including:
        instructing the first gaseous fuel control module and the second gaseous fuel control module to gradually reduce a quantity of the gaseous fuel relative to the liquid fuel from an initial quantity over a phase out period and then cease injection of the gaseous fuel in the first subset of cylinders and the second subset of cylinders while instructing the liquid fuel control module to continue operating the first subset of cylinders and the second subset of cylinders with the liquid fuel over the phase out period;
        deactivating the first subset of cylinders by instructing the liquid fuel control module to cease injection of the liquid fuel into the first subset of cylinders while continuing to inject liquid fuel into the second subset of cylinders; and
        instructing the second gaseous fuel control module to increase the quantity of the gaseous fuel relative to the liquid fuel to the initial quantity over a first phase in period for the second subset of cylinders; and
    exiting the cylinder deactivation mode, including:

instructing the second gaseous fuel control module to gradually reduce the quantity of the gaseous fuel relative to the liquid fuel from the initial quantity in the second subset of cylinders;

activating the first subset of cylinders by instructing the liquid fuel control module to inject the liquid fuel into the first subset of cylinders; and instructing the first gaseous fuel control module and the second gaseous fuel control module to increase the quantity of the gaseous fuel relative to the liquid fuel to the initial quantity in the first subset of cylinders and the second subset of cylinders over a second phase in period.

9. An engine control system, comprising:

a dual fuel internal combustion engine including a plurality of cylinders configured to receive a liquid fuel and a gaseous fuel, the plurality of cylinders being divided into a first subset of cylinders and a second subset of cylinders;

a fuel system including a liquid fuel source and a gaseous fuel source;

a controller, a liquid fuel control module, and at least one gaseous fuel control module, each of the controller, the liquid fuel control module, and the at least one gaseous fuel control module associated with the first subset of cylinders and the second subset of cylinders and communicatively connected over a network;

the controller having an operating mode in which the plurality of cylinders is operational and a cylinder deactivation mode;

the controller in the operating mode being configured to instruct the liquid fuel control module and the at least one gaseous fuel control module to operate the plurality of cylinders in a dual fuel mode in which both the liquid fuel and the gaseous fuel are supplied to the plurality of cylinders; and the controller in the cylinder deactivation mode being configured to:

instruct the at least one gaseous fuel control module to gradually reduce a quantity of the gaseous fuel relative to the liquid fuel from an initial quantity over a phase out period and then cease injection of the gaseous fuel for all cylinders in the plurality of cylinders while instructing the liquid fuel control module to continue operating the plurality of cylinders with the liquid fuel over the phase out period;

instruct the liquid fuel control module to deactivate the first subset of cylinders by ceasing injection of the liquid fuel into the first subset of cylinders after the phase out period while continuing to inject liquid fuel into the second subset of cylinders; and instruct the liquid fuel control module and the at least one gaseous fuel control module to transition to the dual fuel mode in the second subset of cylinders over a phase in period after the first subset of cylinders are deactivated.

10. The engine control system of claim 9, wherein in the dual fuel mode, the controller is configured to:

instruct the liquid fuel control module to inject a quantity of the liquid fuel into each active cylinder of the dual fuel internal combustion engine, and instruct the at least one gaseous fuel control module to inject the quantity of the gaseous fuel into each active cylinder of the dual fuel internal combustion engine.

11. The engine control system of claim 9, wherein the transition to the dual fuel mode in the second subset of cylinders over the phase in period further includes:

instructing the at least one gaseous fuel control module to increase the quantity of the gaseous fuel relative to the liquid fuel to the initial quantity over the phase in period for the second subset of cylinders.

12. The engine control system of claim 9, wherein the at least one gaseous fuel control module further includes:

a first gaseous fuel control module associated with the first subset of cylinders, and a second gaseous fuel control module associated with the second subset of cylinders.

13. The engine control system of claim 9, wherein the cylinder deactivation mode is initiated after the controller determines a cylinder deactivation event.

14. The engine control system of claim 12, wherein the controller is configured to determine a cylinder deactivation event when:

an engine load is below a threshold load and an engine speed is below a threshold speed for a predetermined period of time;

one or more of a coolant temperature, an intake manifold temperature, an ambient temperature, and an inlet air temperature are within a specified temperature range; and no diagnostic faults have been triggered.

15. The engine control system of claim 12, wherein the controller is configured to determine a cylinder deactivation event after receiving a cylinder deactivation mode input from an operator.

16. The engine control system of claim 11, wherein the phase out period is a first phase out period and the phase in period is a first phase in period, and wherein the controller is further configured to:

continue operating the second subset of cylinders for a first deactivation cycle; and deactivate the second subset of cylinders after the first deactivation cycle and reactivate the first subset of cylinders by:

instructing the at least one gaseous fuel control module to reduce the quantity of the gaseous fuel relative to the liquid fuel from the initial quantity over a second phase out period and then cease injection of the gaseous fuel for the second subset of cylinders while instructing the liquid fuel control module to continue operating the second subset of cylinders with the liquid fuel over the second phase out period;

instructing the liquid fuel control module to cease injection of the liquid fuel into the second subset of cylinders and initiate injection of the liquid fuel into the first subset of cylinders; and instructing the at least one gaseous fuel control module to increase the quantity of the gaseous fuel relative to the liquid fuel over a second phase in period for the first subset of cylinders.

17. The engine control system of claim 9, wherein the phase in period is a first phase in period and the controller is further configured to exit the cylinder deactivation mode by:

instructing the at least one gaseous fuel control module to cease injection of the gaseous fuel into the second subset of cylinders while instructing the liquid fuel control module to inject the liquid fuel into the first subset of cylinders and the second subset of cylinders; and instructing the at least one gaseous fuel module to inject the gaseous fuel into the first subset of cylinders and the second subset of cylinders to increase the quantity of the gaseous fuel relative to the liquid fuel over a second phase in period.

* * * * *